(12) United States Patent
Moeser et al.

(10) Patent No.: US 8,898,883 B2
(45) Date of Patent: Dec. 2, 2014

(54) SINGULATION FOR AN APPARATUS FOR FEEDING A CONNECTING ELEMENT

(75) Inventors: Joachim Moeser, Giessen (DE); Christopher Beil, Kelsterbach (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/311,194

(22) Filed: Dec. 5, 2011

(65) Prior Publication Data

US 2013/0019457 A1     Jan. 24, 2013

Related U.S. Application Data

(63) Continuation of application No. PCT/EP2010/056020, filed on May 4, 2010.

(30) Foreign Application Priority Data

Jun. 5, 2009    (DE) .................. 10 2009 024 433

(51) Int. Cl.
| | |
|---|---|
| *B21J 15/02* | (2006.01) |
| *B23P 19/02* | (2006.01) |
| *B23P 11/02* | (2006.01) |
| *B23P 11/00* | (2006.01) |
| *B21D 39/00* | (2006.01) |
| *B23Q 7/10* | (2006.01) |
| *B25C 3/00* | (2006.01) |
| *B23P 19/00* | (2006.01) |
| *B21J 15/32* | (2006.01) |

(52) U.S. Cl.
CPC .............. *B23P 19/006* (2013.01); *B21J 15/32* (2013.01); *B23P 19/003* (2013.01); *B23P 19/007* (2013.01)
USPC .... 29/525.06; 29/525.05; 29/525; 29/243.54; 29/243.53; 72/424; 221/270; 227/119

(58) Field of Classification Search
CPC .... B23P 19/006; B23P 19/003; B23P 19/007; B21J 15/32; B21J 15/10; B21J 15/02; B21J 15/28; B21J 15/323
USPC .............. 29/525.06, 525.05, 809, 811.2, 816, 29/818, 525, 505, 243.53, 243.54; 221/224, 263, 268, 270; 72/424; 227/107, 119, 135, 15, 18, 112
See application file for complete search history.

(56) References Cited

U.S. PATENT DOCUMENTS 3,232,076 A * 2/1966 Sundt .............................. 464/79
3,944,177 A * 3/1976 Yoda ............................ 248/74.2

(Continued)

FOREIGN PATENT DOCUMENTS

| CN | 101058176 A | 10/2007 |
| CN | 201089141 Y | 7/2008 |

(Continued)

OTHER PUBLICATIONS

Chinese Search Report dated Aug. 8, 2013.

*Primary Examiner* — David Bryant
*Assistant Examiner* — Bayan Salone
(74) *Attorney, Agent, or Firm* — Michael P. Leary (57) ABSTRACT

An apparatus and method are provided for feeding a connecting element into a processing position of a joining apparatus. The apparatus includes a singulation slide for separating and feeding a connecting element. The singulation slide has a through-hole running in an axial direction for accommodating the connecting element, and the through-hole is partially defined by two leg segments. The singulation slide includes a base segment and the transition from the base segment to each of the leg segments is designed so that the leg segments are flexible in a radial direction.

13 Claims, 6 Drawing Sheets

(56) References Cited

U.S. PATENT DOCUMENTS

| | | | | |
|---|---|---|---|---|
| 4,438,867 A | * | 3/1984 | Mayne et al. | 221/197 |
| 4,643,344 A | * | 2/1987 | Kaita et al. | 227/112 |
| 4,653,182 A | * | 3/1987 | Fukuda et al. | 29/754 |
| 4,744,238 A | * | 5/1988 | Halbert | 29/812.5 |
| 4,765,175 A | * | 8/1988 | Denham et al. | 29/812.5 |
| 5,205,456 A | * | 4/1993 | Ohuchi et al. | 227/57 |
| 5,236,341 A | * | 8/1993 | Stafford | 221/200 |
| 5,327,639 A | * | 7/1994 | Wing et al. | 29/709 |
| 5,522,129 A | * | 6/1996 | Shinjo | 29/798 |
| 5,544,407 A | * | 8/1996 | Ohuchi et al. | 29/525.06 |
| 5,651,169 A | * | 7/1997 | Ohuchi et al. | 29/243.525 |
| 6,082,233 A | * | 7/2000 | Han | 81/453 |
| 6,629,360 B2 | * | 10/2003 | Ohuchi | 29/812.5 |
| 7,007,364 B2 | * | 3/2006 | Robertson et al. | 29/432 |
| 7,020,955 B2 | * | 4/2006 | Joseph et al. | 29/809 |
| 7,043,827 B2 | * | 5/2006 | Ohuchi et al. | 29/823 |
| 7,159,291 B2 | * | 1/2007 | Ohuchi | 29/243.525 |
| 7,418,774 B2 | * | 9/2008 | Joseph et al. | 29/434 |
| 7,930,810 B2 | * | 4/2011 | Mitomi | 29/243.525 |
| 8,015,686 B2 | * | 9/2011 | Hain et al. | 29/432.2 |
| 8,015,699 B2 | * | 9/2011 | Fulbright | 29/818 |
| 8,256,104 B2 | * | 9/2012 | Fulbright | 29/818 |
| 8,359,731 B2 | * | 1/2013 | Chiapuzzi | 29/709 |
| 2007/0289354 A1 | * | 12/2007 | Reiter | 72/424 |
| 2008/0251501 A1 | * | 10/2008 | Schmidt | 219/107 |
| 2011/0289763 A1 | * | 12/2011 | Hain et al. | 29/525.06 |

FOREIGN PATENT DOCUMENTS

| | | |
|---|---|---|
| CN | 201098868 Y | 8/2008 |
| DE | 29902398 U | 9/1999 |
| DE | 10011479 A | 2/2001 |

* cited by examiner

SINGULATION FOR AN APPARATUS FOR FEEDING A CONNECTING ELEMENT

CROSS-REFERENCE TO RELATED APPLICATIONS

This application is a continuation of PCT Application No. PCT/EP2010/056020 which claims priority from German Patent Application No. 10 2009 024 433.6, filed on Jun. 5, 2009, the disclosure of which is incorporated herein by reference.

BACKGROUND OF THE INVENTION

The present invention relates to a singulation slide for an apparatus for feeding a connecting element to an apparatus for feeding a connecting element and to a related method.

A singulation device for feeding connecting elements is known, for example, from document WO 2006/084847 A1.

In the field of joining technology there are a multiplicity of automated joining apparatuses for accelerating production and assembly processes and making them more cost-effective. In these joining apparatuses, components or connecting elements must likewise be fed in an automated manner so that the complete apparatus can work independently. A specific application in this case is automatic riveters, which are used in all fields of technology for connecting workpieces.

The invention presented below relates in particular to the field of riveting technology and to the feeding and processing of rivets. However, this is not to be understood as a limitation of the field of application of the present invention. The present invention can also be used for other connecting elements of the same kind.

To feed rivets to a rivet processing tool, publication WO 2006/084847 A1 proposes a feed passage through which a plurality of rivets are delivered by means of compressed air. A plurality of rivets then come to bear against one another at an end of the feed passage, such that a "rivet column" is formed. From this rivet column formed from the plurality of rivets, the rivets are to be singulated (separated) so that they can then be processed individually.

To this end, it is WO 2006/084847 discloses that two elastic rails, on which the first rivet of the rivet column rests with its rivet head, be provided at the end of the feed passage. From this initial position, the rivet is then displaced into an intermediate position by means of a, for example hydraulically or pneumatically operated, slide. The rivet is then secured in this intermediate position firstly by the two rails and secondly by a spring-loaded pawl element, such that it can no longer leave the intermediate position. From this intermediate position, in which the rivet is arranged below a rivet punch, the rivet is then pushed by the rivet punch into a processing position in which the rivet is fixed by a securing sleeve.

During such a singulation operation, however, it is possible for a rivet to become jammed. The reason for this lies in the fact that a rivet, in the initial position, is merely held in its position laterally by the two rails. If the rivet is now moved by the slide, the rivet can rotate or tilt slightly. If this is the case, a rivet following in the rivet column can at least partly slip down and jam or block the slide.

Furthermore, this singulation mechanism has a multiplicity of small parts, for instance the rails, the pawl and the corresponding springs, which necessitates a complicated assembly and increases the maintenance requirements.

To improve such a feed apparatus, publication DE 299 02 398 U1 therefore proposes an apparatus for the singulation of rivets, said apparatus providing a special loading element which transports the rivet from the initial position into the intermediate position. The loading element has a receptacle between at least two parts of the loading element, wherein the parts can give way radially relative to the rivet punch. The two parts enclose the rivet in the initial position in a pincer-like manner, such that it is securely held all round. These two parts are then moved by a slide along a guide into the intermediate position, the guide in turn being designed to be radially elastic in the region of the intermediate position so that the two parts can open in the intermediate position. In this case, the rivet bears between the two parts against a conical bevel and can therefore be pressed into the processing position while the two parts and the elastic guide expand.

Although such a singulation apparatus provides improved securing of the rivet in the initial position, it still has a large number of individual parts, for instance the two parts of the loading element, guide elements, springs for providing elasticity of the guide elements, and connecting elements such as bolts or screws in order to provide the mobility of the parts and of the guide elements.

BRIEF SUMMARY OF THE INVENTION

It is therefore an object of the present invention to provide a device which is of simpler construction and permits reliable singulation (separation) of connecting elements, in particular rivets.

According to the invention, a singulation slide for an apparatus for feeding a connecting element is proposed for this purpose, wherein the singulation slide has a through-hole running in an axial direction for accommodating the connecting element, and wherein the through-hole is formed by at least two leg segments. Furthermore, the singulation slide is designed in one piece and has a base segment, wherein a transition from the base segment to each of the leg segments is designed in such a way that an elasticity of the corresponding leg segments is provided in a radial direction.

Due to the provision of the through-hole for accommodating the connecting element, in particular a rivet, the connecting element is securely held in the singulation slide in all four directions. Rotation or tilting of the rivet after it has been fed to the singulation slide is not possible. Furthermore, by the leg segments being provided with radial elasticity, it is possible for a rivet punch to be able to push the rivet through the singulation slide into a processing position. In the process, the leg segments can give way radially. As a rule, the rivet comprises a rivet shank and a rivet head, the rivet head coming to rest on the leg segment. The rivet head is therefore as a rule provided with a larger diameter than the diameter of the through-hole. To this extent, radial elasticity of the leg segments must be provided so that the head of the rivet can pass through the through-hole.

By the singulation slide being designed in one piece, and by the radial elasticity of the leg segments being provided by their connection to the base element, a multiplicity of individual parts can be saved. For example, a radially elastic guide is no longer necessary in order to move back the leg segments when a rivet has been pushed through the through-hole. Furthermore, no bolt or screw connections at all have to be provided in order to provide mobility of the leg segments or of the guide segments.

According to a further aspect of the invention, an apparatus for feeding a connecting element into a processing position is provided, said device having a singulation slide according to the invention.

The method according to the invention for feeding a connecting element having a head and a shank comprises the steps of feeding the connecting element, in particular a rivet, through a feed passage into an initial position into a through-hole, running in an axial direction, of a one-piece singulation slide, such that the head of the connecting element rests on a conical bevel of the through-hole formed by at least two leg segments, wherein a transition from a base segment to each of the leg segments is formed in such a way that elasticity of the corresponding leg segments is provided in the radial direction, displacing the singulation slide, such that the connecting element is brought from the initial position into an intermediate position below a punch, and moving the punch through the through-hole of the singulation slide, such that the connecting element is brought from the intermediate position into a processing position through the singulation slide while the leg segments expand.

The stated object is therefore completely achieved.

Furthermore, in a preferred embodiment of the singulation slide according to the invention, provision may be made for the through-hole to be formed by the base segment and two leg segments.

In this way, the rivet is held in the singulation slide laterally by the radially elastic leg segments, in a feed direction likewise by the radially elastic leg segments, and in the opposite direction to the feed direction of the singulation slide by the base element, such that the rivet is securely supported on the base element when being brought from the initial position into the intermediate position.

Furthermore, provision can preferably be made for the respective transition to be provided by a thin-walled web, the height of which is reduced relative to a height of the singulation slide. In this case, the expression "thin-walled" should be understood to the effect that the web is selected in its thickness depending on the elasticity to be provided and on the material of the singulation slide, in such a way that the leg segment can expand in a desired manner and with desired spring strength. Furthermore, elastic deformation is to be provided, such that each leg element returns into its initial position after the expansion.

The desired radial elasticity can therefore be provided by the corresponding selection of a width and height of the web. In particular, due to the reduced height, the web can be made wider than would be possible in a web having the full height, such that increased resistance to fracture is provided. The height of the web may of course also correspond to the height of the singulation slide, the desired radial elasticity then being provided, for example, by the web width or the material of the singulation slide.

Furthermore, provision can preferably be made for a hole to be drilled at one end of a separating line between each of the leg segments and the base segment.

This measure also helps to increase the resistance to fracture. In particular, the angle by which the leg segments can be expanded relative to the base segment can be increased in this way.

Furthermore, a receptacle is provided for accommodating a feed device in the singulation slide.

This can provide a reliable connection, for example to a reciprocating piston, which can be operated hydraulically or pneumatically, or in another manner, in order to move the singulation slide between the initial position and the intermediate position.

Furthermore, in a preferred embodiment, the through-hole of the singulation slide has a conical bevel, such that the head of the connecting element can rest on the conical bevel.

The conicity of the bevel makes it easier to push the connecting element through the through-hole and also assists the expansion of the leg segments.

Furthermore, in the apparatus according to the invention, provision can be made for a radially elastic guide to be provided which provides a predetermined position of the singulation slide in the intermediate position.

In this way, the arrangement of the singulation slide in the intermediate position can be additionally supported and it can be ensured that the leg segments return into their initial position when the rivet has been pushed through the through-hole.

Furthermore, in the method according to the invention, provision can be provided for first of all the punch and then the singulation slide to be moved back after the processing of the connecting element.

In this procedure, first of all the punch is pulled back through the through-hole, such that the singulation slide can be moved back without the leg segments having to be expanded again. In this way, the transitions between the leg segments and the base segment are loaded to a much smaller extent and the service life of the singulation slide is increased.

Alternatively, provision can also be made in the method according to the invention for the singulation slide to be moved back, with the leg segments expanding further, while the connecting element is processed.

In this procedure, the leg segments are expanded in such a way that they move around the rivet punch when the singulation slide is being moved back. In this way, although the transitions between the leg segments and the base segment are loaded to a greater extent, it is possible to already feed the next rivet to the singulation slide in the initial position, while processing takes place or the rivet punch is pulled back, such that the number of cycles of the complete apparatus can be increased.

It goes without saying that the abovementioned features and the features still to be explained below can be used not only in the respectively specified combination but rather also in other combinations or on their own without departing from the scope of the present invention.

BRIEF DESCRIPTION OF THE SEVERAL VIEWS OF THE DRAWING

Exemplary embodiments of the invention are shown in the drawing and are described in more detail below. In the drawing.

DETAILED DESCRIPTION OF THE PREFERRED EMBODIMENT(S)

Figure 1:
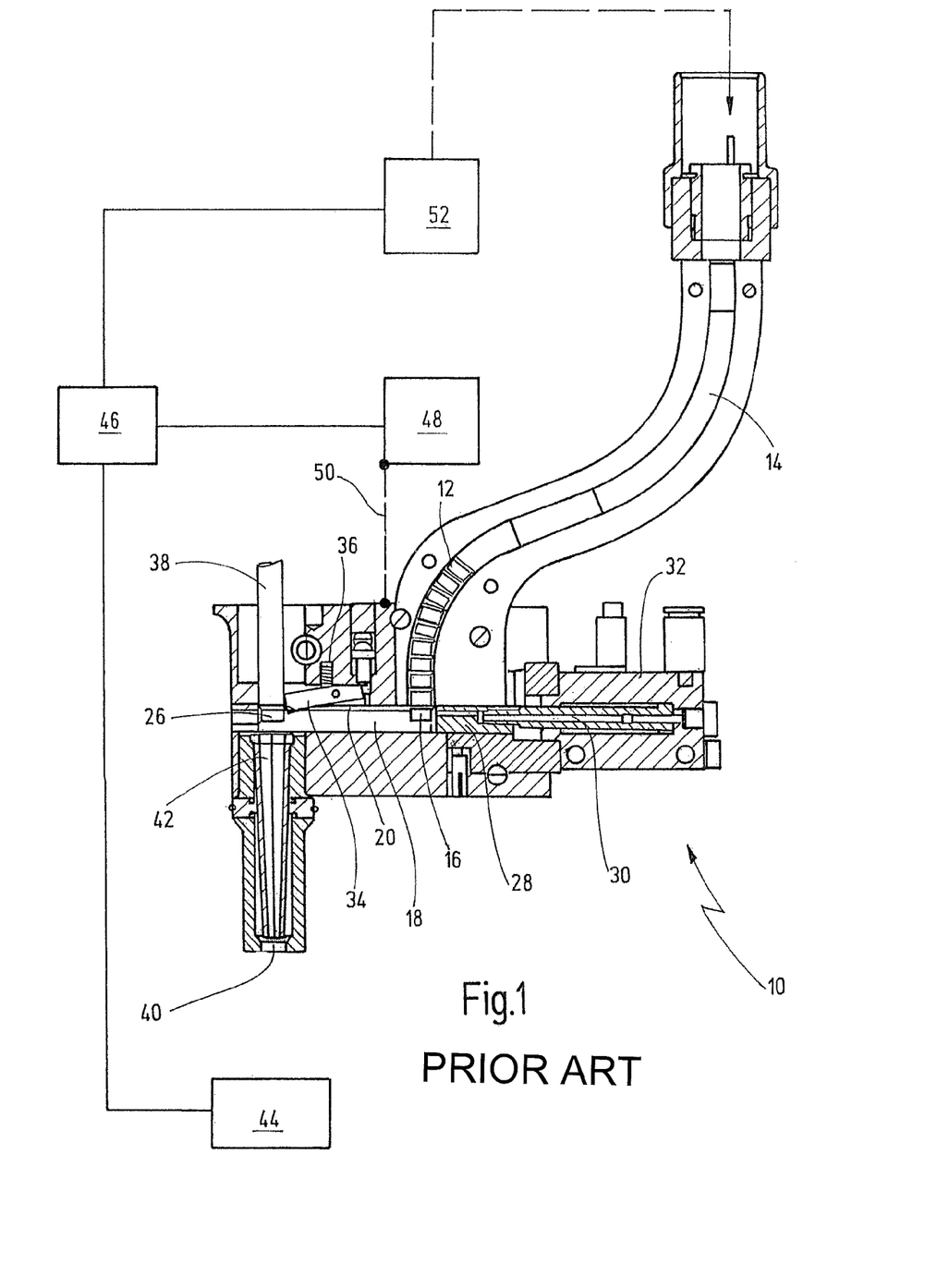
FIG. 1 shows an apparatus for feeding a connecting element into a processing position according to the prior art.

An apparatus is generally designated by 10 in FIG. 1. The apparatus 10 serves to feed connecting elements 12, in the present case rivets.

The rivets 12 are brought to the apparatus 10 through a feed passage 14. This can take place by means of compressed air for example. The fed rivets 12 then pile up in the form of a rivet column at an apparatus-side end of the feed passage 14.

In the process, the force due to the weight of the rivet column pushes the first rivet 12 into an initial position 16 in which it rests between two rails 18 on bevels 20 appropriately provided on the rails 18. Alternatively or additionally, provision may also be made for the rivet column to be pushed into the initial position 16 by an applied air flow.

Figure 2:
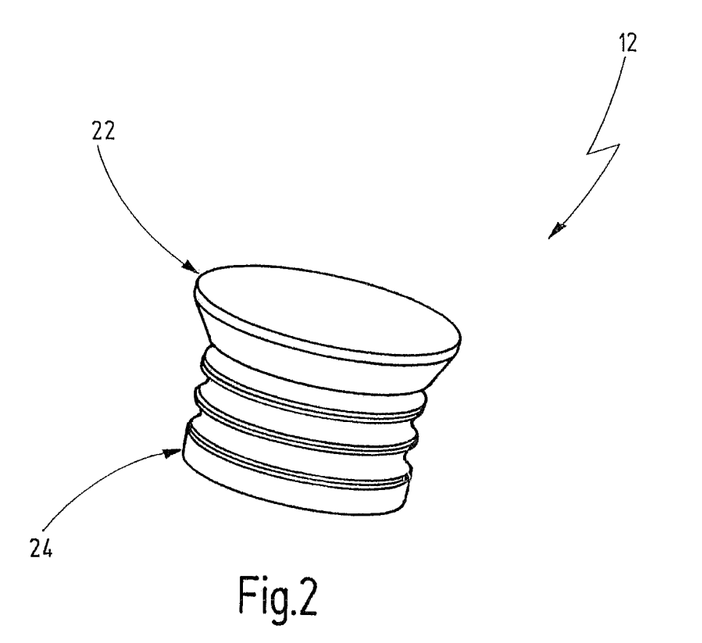
FIG. 2 shows an exemplary connecting element in the form of a rivet.

A rivet 12 is shown by way of example in FIG. 2. The rivet 12 has a rivet head 22 and a rivet shank 24. In this case, the rivet head 22 has a larger diameter than the rivet shank 24. Accordingly, in the initial position 16, the rivet 12 then rests with its rivet head 22 on the bevel 20 of the rails 18.

From the initial position 16, the rivet 12 is brought into an intermediate position 26. To this end, a feed device 28 is provided, for example a reciprocating piston. A pneumatic or hydraulic system 30 can be provided for actuating the reciprocating piston. Of course, all other types of reciprocating devices may also be provided. The feed device 28 and the other elements of the apparatus 10 are surrounded by a housing 32.

In the intermediate position 26, the rivet 12 is then firstly held laterally by the rails 18 and furthermore fixed by a latching element 34. The latching element 34 is preloaded by means of a spring 36, such that the rivet 12, when it is moved into the intermediate position 26, can be pushed past the latching element 34, which then latches in place in such a way that the rivet 12 is fixed in the intermediate position 26. The feed device 28 can then be moved back again into its initial position.

In the intermediate position 26, the rivet 12 is arranged beneath a punch 38, which is normally also designated as rivet punch. The punch 38 is provided for bringing the rivet 12 from the intermediate position 26 into a processing position 40.

In the process, the punch 38 pushes the rivet 12 through the rails 18 past a securing sleeve 42 into the processing position 40. The securing sleeve 42 is in this case prestressed in such a way that, in the processing position 40, it engages behind and fixes the head 22 of the rivet 12.

In this case, the end portions of rails 18 are movable in a radial direction, such that they can expand in such a way that the head 22 of the rivet 12 can slide down on the bevel 20 and enter the securing sleeve 42 through the rails 18.

The rivet 12 is then processed in the processing position 40. A connecting device 44 can be provided for this purpose, for example a rivet gun, which is not shown in detail in FIG. 1.

A controller 46 may be provided for controlling the feed and joining operation, said controller 46 controlling a robotic system 48 having an arm 50 which can move the apparatus 10 in space.

Furthermore, the controller 46 controls a corresponding pneumatic system 52 which delivers rivets 12 from a reservoir through the feed passage 14.

Figure 3:
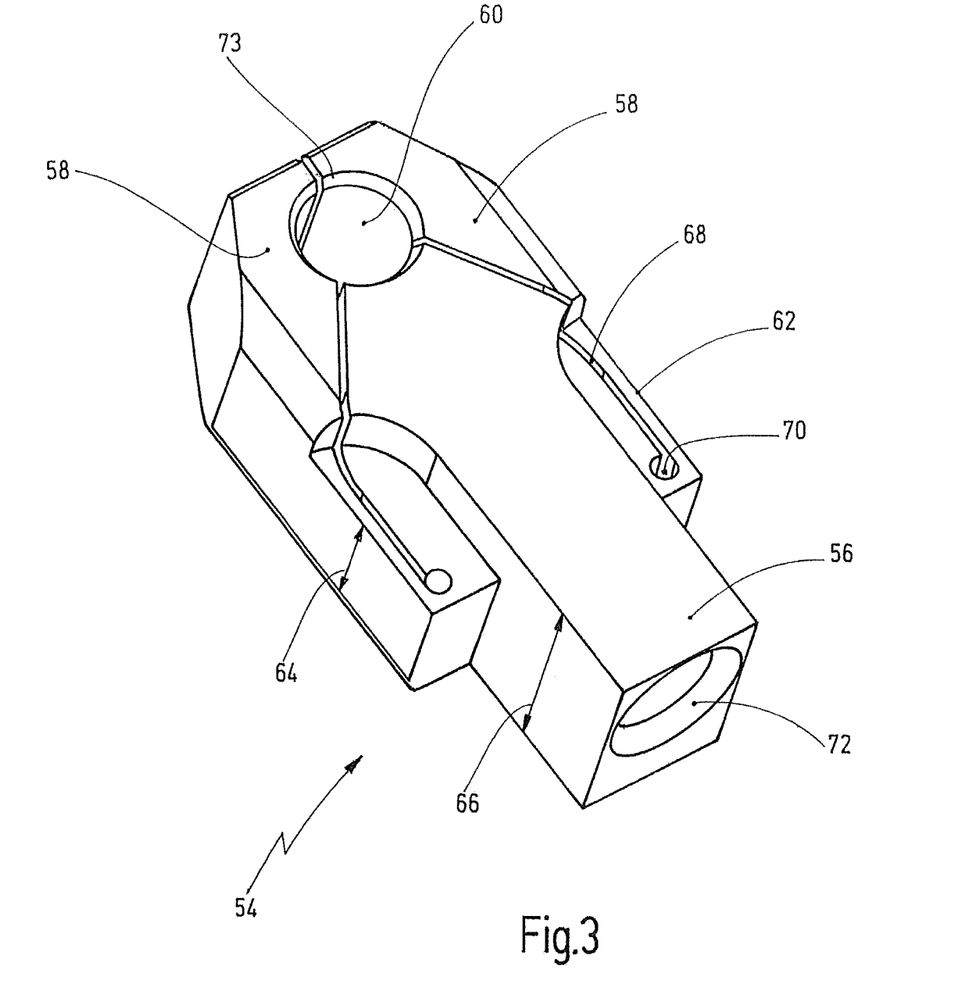
FIG. 3 shows a singulation slide in a preferred embodiment.

To improve the apparatus shown in FIG. 1, a singulation slide 54 shown in FIG. 3 is provided according to the invention.

The singulation slide 54 has a base segment 56 and two leg segments 58 which are arranged on opposite sides of the base segment 56. The base segment 56 and the leg segments 58 form a through-hole 60 which serves to accommodate a rivet 12 and has a conical bevel 73. The leg segments 58 are each connected to the base segment 56 by a respective thin-walled web 62. The height 64 of the respective web 62 is reduced in comparison with a height 66 of the base 56 of singulation slide 54.

A hole 70 is located at one end of a separating line 68, which runs between a respective leg segment 58 and the base segment 56, in order to assist expansion of the leg segments 58.

Furthermore, a receptacle 72 is provided in the base segment 56. The feed device 28 can engage receptacle 72 in order to move the singulation slide 54.

Figure 4:
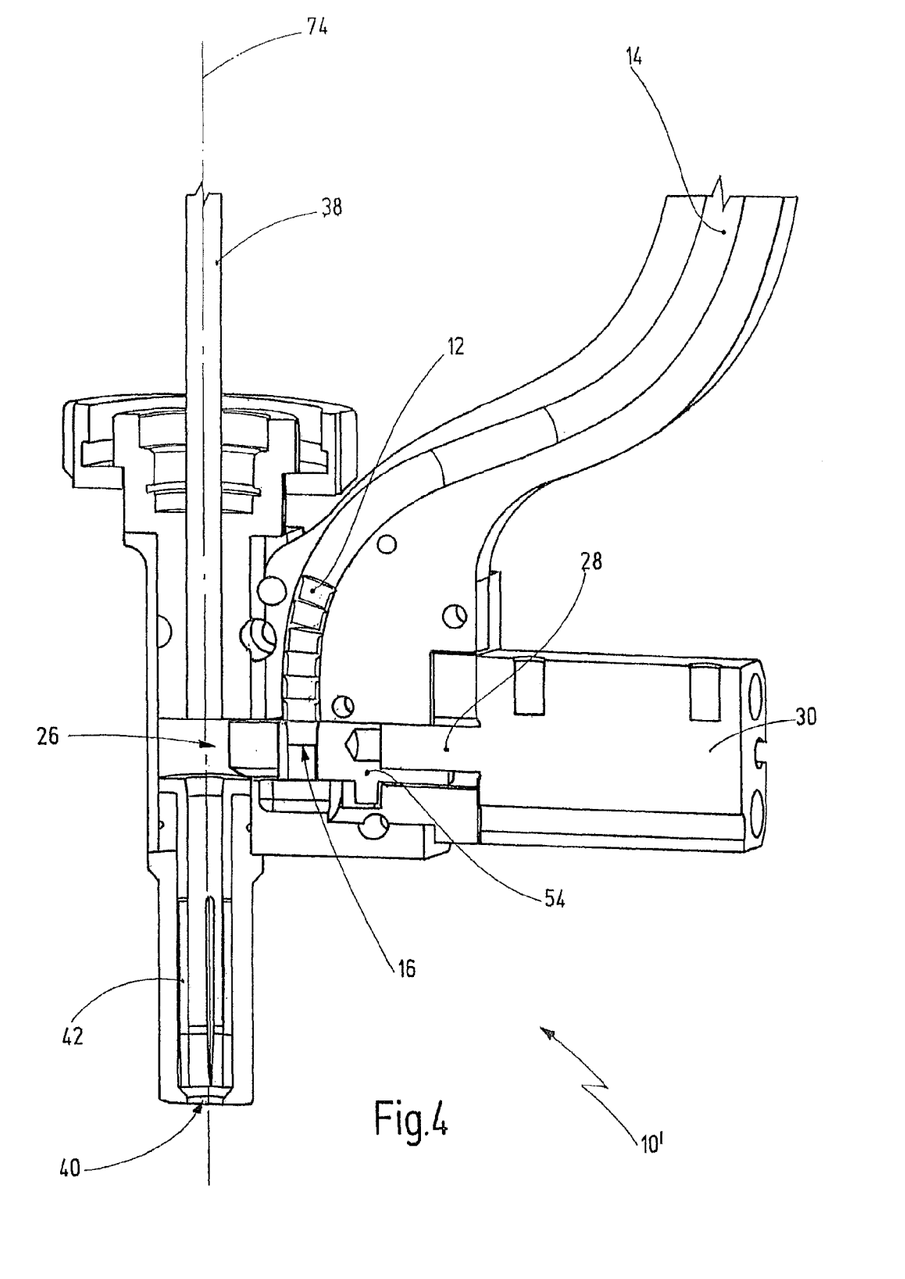
FIG. 4 shows a schematic cross-sectional view of an apparatus according to the invention for feeding a connecting element, with a singulation slide according to the invention holding a connecting element in an initial position.

An apparatus 10' according to the invention having a singulation slide 54 according to the invention is shown schematically in a cross-sectional view in FIG. 4, the singulation slide 54 being located in an initial position 16.

Figure 5:
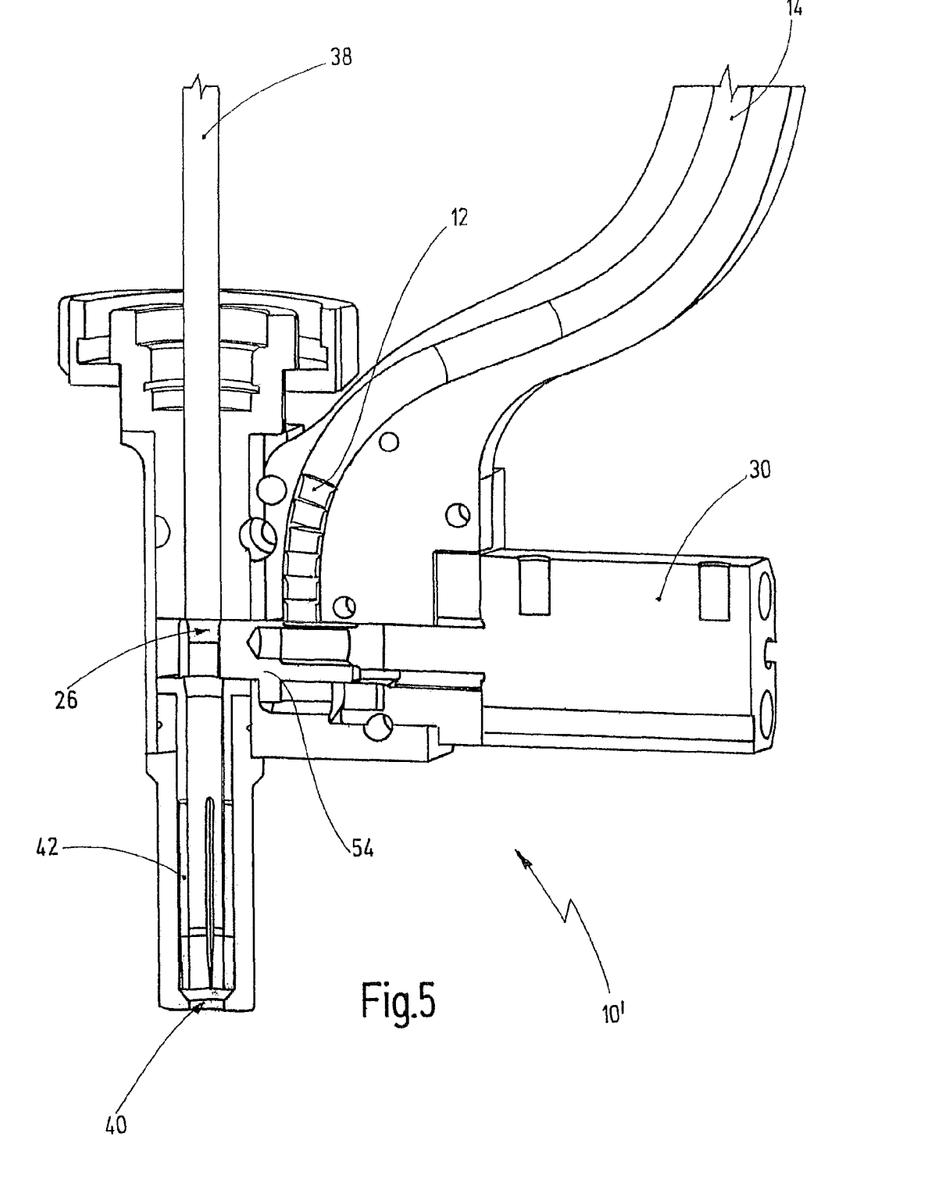
FIG. 5 shows the apparatus in FIG. 4 holding a connecting element in an intermediate position.
Figure 6:
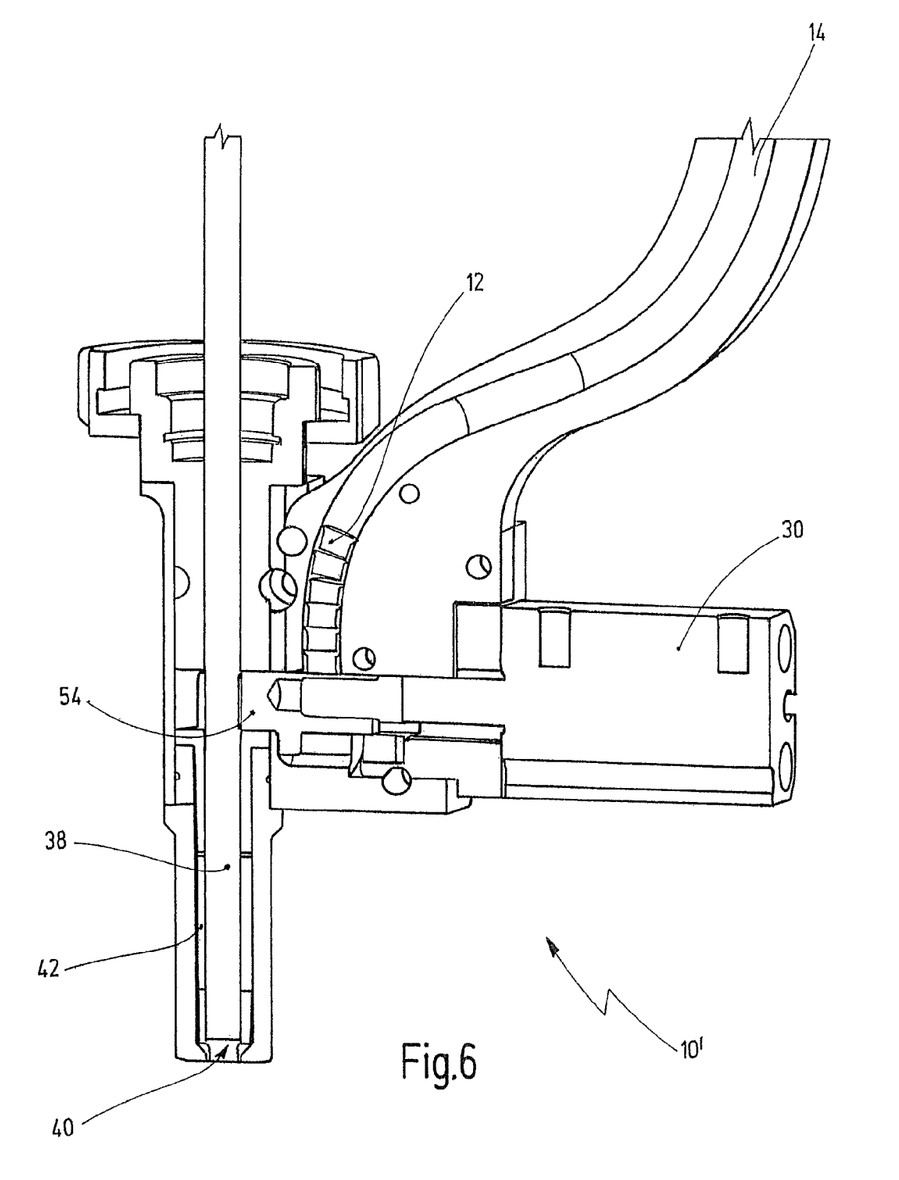
FIG. 6 shows the apparatus in FIG. 4 holding a connecting element in a processing position.

With regard to its functioning, the apparatus 10' shown in FIGS. 4 to 6 generally corresponds to the apparatus 10 of FIG. 1. The corresponding elements are therefore designated by the same reference symbols. Only the differences are dealt with below. The general method sequence during the feeding and processing of the connecting elements 12 is also otherwise identical, in so far as nothing else is mentioned.

In the initial position 16, a connecting element 12 is pushed from the feed passage 14 into the singulation slide 54. In this process, the connecting element 12 rests with its head 22 on the conical bevel 73 of the through-hole 60 in such a way that the head 22 projects slightly.

In this initial position, the rivet 12 is securely held by the leg segments 58 and the base element 56 and can neither rotate nor tilt when it is brought from the initial position 16 into the intermediate position 26. To this end, the singulation slide 54 is displaced by the feed device 28 until the rivet 12 is located in the intermediate position 26 below the rivet punch 38.

The rivet punch 38 is displaceable along a longitudinal axis 74. The rivet punch 38 can thus push the rivet 12 out of the intermediate position 26 through the singulation slide 54 into the processing position 40. To this end, the head 22 of the rivet 12 slides down on the conical bevel 73 of the singulation slide 54, in the course of which the leg segments 58 expand. The head 22 of the rivet 12 can therefore pass through the through-hole 60. The rivet punch 38 is displaced through the through-hole 60, in order to move the rivet 12 to the processing position 40. FIG. 6 shows the punch 38 pushed completely through the singulation slide 54 and the rivet 12 is located in the processing position 40.

Accordingly, sufficiently free space in the radial direction is to be provided in the intermediate position 26 so that the leg segments 58 can expand. An additional guide, which is not designated in any more detail in the figures, is provided in the intermediate position 26, said guide likewise being designed to be radially elastic.

During the return of the entire apparatus 10' into the initial position 16, either provision may alternatively be made to first move back the rivet punch 38 and then the singulation slide 54, or, alternatively, provision may be made for the singulation slide 54 to be moved back to the initial position 16 while the punch 38 is still in the processing position 40 shown in FIG. 6, with the leg segments 58 expanding around the punch 38, in order to reduce the processing time of the entire operation and be able to accordingly increase the number of cycles.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A singulation slide for separating and feeding a connecting element within a joining apparatus, including a feed apparatus, from a first position, wherein the singulation slide separates and embarks a single connecting element from a plurality of connecting elements, to a second position, where the connecting element is removed from the singulation slide prepatory for use in a joining operation, the singulation slide comprising:
- a base segment;
- a first leg segment and a second leg segment unitary with the base segment and flexibly joined to the base segment;
- a through-hole for releasably holding the connecting element, the through-hole running in an axial direction and partially defined by the base segment, the first leg segment, and the second leg segment;
- an axially extending separating line defined between the base segment and the first leg segment, and the separating line extends lengthwise from a first end at the through hole to a second end at a drilled hole; and
- the first leg segment is movable in a first radial direction and the second leg segment is movable in a second radial direction from a holding position, wherein the through-hole accepts and holds the connecting element, to a release position, wherein the through hole is expanded to release and permit axial through passage of the connecting element.

2. A singulation slide according to claim 1 wherein in the first leg segment and the second leg segment are each flexibly joined to the base segment by a respective thin-walled web.

3. A singulation slide according to claim 1 in which the base segment defines a first axial height and the thin-walled web defines a second axial height, and the second axial height is less than the first axial height.

4. A singulation slide according to claim 1, and further including a receptacle, partially defined by the base segment, for accommodating a feed device.

5. A singulation slide according to claim 1 wherein the through-hole is defined at a first axial end by a conical bevel, and the connecting element is axially supportable in the trough-hole by the conical bevel.

6. A joining apparatus for feeding a connecting element into a processing position, the joining apparatus comprising
- a feed passage for delivering the connecting element to an initial position:
- a singulation slide for carrying the connecting element in a first direction from the initial position to an intermediate position; and
- a punch for moving the connecting element in a second direction, transverse to the first direction, from the intermediate position to the processing position; and
- wherein the singulation slide comprises:
  - a base segment;
  - a first leg segment and a second leg segment unitary with the base segment and flexibly joined to the base segment;
  - a through-hole for releasably holding the connecting element, the through-hole running in an axial direction and partially defined by the base segment, the first leg segment, and the second leg segment;
  - an axially extending separating line defined between the base segment and the first leg segment, and the separating line extends lengthwise from a first end at the through hole to a second end at a drilled hole; and
  - the first leg segment is movable in a first radial direction and the second leg segment is movable in a second radial direction from a holding position, wherein the through-hole accepts and holds the connecting element, to a release position, wherein the through hole is expanded to release and permit axial through passage of the connecting element.

7. A joining apparatus according to claim 6 wherein in the first leg segment and the second leg segment of the singulation slide are each flexibly joined to the base segment by a respective thin-walled web.

8. A method of feeding a connecting element including a head and a shank, the method comprising the following steps:
- providing a singulation slide including: a base segment; a first leg segment and a second leg segment unitary with the base segment and flexibly joined to the base segment for pivotability in the radial direction; a through-hole for releasably holding the connecting element, the through-hole running in an axial direction and partially defined by the base segment, the first leg segment, and the second leg segment; and an axially extending separating line defined between the base segment and the first leg segment, and the separating line extends lengthwise from a first end at the through hole to a second end at a drilled hole;
- feeding the connecting element through a feed passage into an initial position in the axial through-hole, such that the head of the connecting element rests on a conical bevel of the through-hole;
- displacing the singulation slide with the embarked connecting element in a first longitudinal direction from the initial position to an intermediate position below the punch;
- moving the punch through the through-hole of the singulation slide in a first axial direction transverse to the first longitudinal direction;
- driving the connecting element axially through the singulation slide and from the intermediate position into a processing position; and
- radially pivoting the first leg segment and the second leg segment to permit passage of the connecting element through the through-hole of the singulation slide.

9. A method according to claim 8 further comprising the following steps after the connecting element is in the processing position:
- moving the punch in a second axial direction opposite to the first axial direction, so that the punch is cleared from the through-hole of the singulation slide; and then
- moving the singulation slide in a second longitudinal direction, opposite to the first longitudinal direction.

10. A method according to claim 8 further comprising the following steps after the connecting element is in the processing position:
- moving the singulation slide in a second longitudinal direction, opposite to the first longitudinal direction;
- radially pivoting the leg segments to release the punch from the through-hole of the singulation slide; and then
- moving the punch in a second axial direction opposite to the first axial direction.

11. A singulation slide according to claim 1, wherein the separating line is a first separating line and the drilled hole is a first transverse hole parallel to the through hole, and further comprising
- a second separating line defined between the base segment and the second leg segment, and the second separating line extends lengthwise from an open end at the through hole to a closed end at a second transverse hole parallel to the through hole; and a third separating line defined between the first leg segment and the second leg segment and extending from the through hole outward to a free end of the first leg segment.

12. A singulation slide according to claim 11, wherein the height of the first transverse hole is less than the height of the through hole.

13. A singulation slide according to claim 11, wherein a circumference of the through hole is divided into a first arc segment in the first leg segment, a second arc segment in the second leg segment, and a third arc segment in the base segment.

* * * * *